Nov. 3, 1970     KARL-HEINZ BAROWSKI     3,538,359

OSCILLATING MOTOR STRUCTURE

Filed May 1, 1969

INVENTOR
KARL-HEINZ BAROWSKI
BY
ATTORNEY

United States Patent Office 3,538,359
Patented Nov. 3, 1970

3,538,359
OSCILLATING MOTOR STRUCTURE
Karl-Heinz Barowski, Frankfurt am Main, Germany, assignor to Braun Aktiengesellschaft, Frankfurt am Main, Germany
Filed May 1, 1969, Ser. No. 821,035
Claims priority, application Germany, May 2, 1968, 1,757,384
Int. Cl. H02k 33/02
U.S. Cl. 310—29    14 Claims

ABSTRACT OF THE DISCLOSURE

An electric toothbrush of which the handle accommodates at least one bar magnet and at least one electromagnet. When the circuit of the electromagnet is completed, the electromagnet produces an alternating magnetic field which causes oscillation of an armature secured to the drive which carries the bristles.

BACKGROUND OF THE INVENTION

The present invention generally relates to an electrically actuated appliance and more specifically to an electric toothbrush incorporating a rotor-stator arrangement adapted to produce oscillations to actuate the brush member of the toothbrush.

Electric toothbrushes are known and their good functioning is, among other aspects, directly dependent upon the shape and size of its housing which, in this instance, functions as the handle and encloses the electric drive means for the brush member of this appliance.

Conversely, it will be appreciated that a strong drive of the brush member is directly dependent on the power of the electric motor housed in the handle, which strength usually is determined by the size and arrangement of this motor.

In a conventional toothbrush, whose power drive is produced by an oscillating armature, the drive comprises a stator having two pole shafts flanking an armature which is oscillatable about an axis which is parallel with the longitudinal direction of the handle. Such drive is rather compact, however, its power output is rather unsatisfactory.

SUMMARY OF THE INVENTION

An object of the invention is to provide a compact, electrically driven toothbrush whose power output exceeds the power output of presently known toothbrushes.

The invention is embodied in an appliance, particularly a toothbrush, which comprises an elongated hollow handle with an opening at its front end, a brush member movably mounted on the front end and including an oscillatable actuating member extending through this opening into the handle, at least one elongated electromagnet arranged in the hollow handle and extending in longitudinal direction thereof, an elongated permanent magnet arranged also in the hollow handle adjacent to the elongated electromagnet, the two magnets having pole faces at their front ends facing the front end of the handle, an oscillatable aramture mounted on the actuating member located in the hollow handle adjacent the pole faces of the electromagnet and the permanent magnet, and electrical circuit means for initiating an alternating magnetic field in the electromagnet so as to oscillate the armature and thereby oscillate the actuating member and the appliance connected thereto.

These and other objects, features and advantages of the present invention will become more obvious from the following description when taken in consideration with the accompanying drawings which show, for purposes of illustration only, an embodiment in accordance with the present invention and wherein.

DESCRIPTION OF THE PREFERRED EMBODIMENTS

Figure 1:
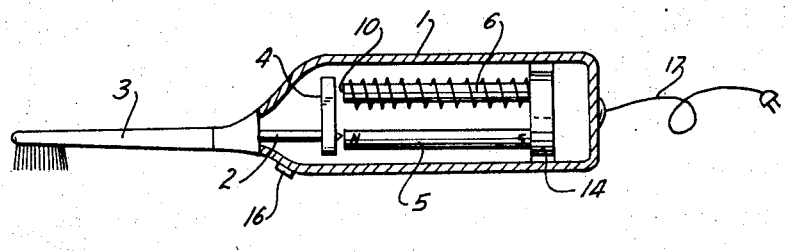
FIG. 1 shows a partial cross-sectional side view of the electric toothbrush arrangement in accordance with the present invention.
Figure 2:
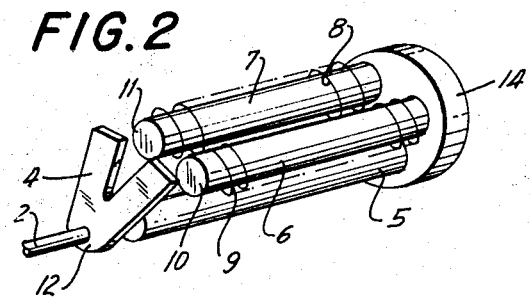
FIG. 2 illustrates a perspective view of an electric motor with an oscillatable armature incorporated in the embodiment according to the invention.
Figure 5:
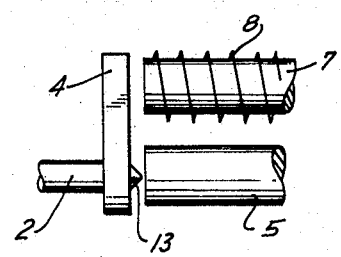
FIG. 5 shows an enlarged side view of details shown in FIG. 1.

As shown in FIG. 1, an electrically driven toothbrush comprises an elongated hollow housing which encloses an electric motor adapted for the production of oscillations. Housing 1, which functions as handle of the appliance, is formed with an opening at its front end through which a drive shaft 2 eccentrically extends, which drive shaft, exteriorly of the housing, is coupled to a brush member 3.

The electric motor is seen to comprise a stator fixedly mounted in housing 1 and an oscillatable armature 4 mounted on the drive shaft 2. The stator preferably consists of a permanent magnet 5 and two electromagnets, the latter formed with bar-shaped iron cores 6 and 7 and windings 8 and 9. The iron cores 6 and 7 have a circular cross-sectional configuration and are disposed so that their front ends 10 and 11 face the front end of the handle and so that these front ends lie in the same plane with the front end of permanent magnet 5.

The outline of the armature resembles a triangle which is located in a plane parallel to the front end faces of the electromagnets. A corner portion 12 of the armature 4 is mounted on the drive shaft 2 in such a way that it is located at a minimum distance from the front faces 10 and 11. The drive shaft 2 has an abutment 13 provided on that end facing the front face of permanent magnet 5.

Figure 7:
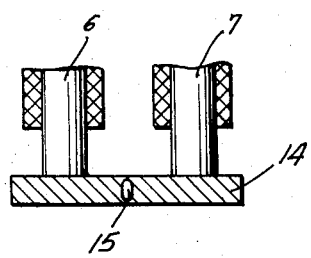
FIG. 7 shows a longitudinal cross-sectional partial view of the armature.

The permanent magnet 5 and the electromagnet are secured to a common supporting plate 14 which is fixedly anchored in the housing 1. The distribution of flux between the iron cores and to the permanent magnet is influenced by a magnet resistor formed by a notch 15 provided in the supporting plate 14, see FIG. 7.

The means for starting and arresting the motor comprises an electric switch 16 whose terminals are connectable with a power source by way of a cable 17.

Figure 3:
FIG. 3 shows a front view of a variation of the oscillatable armature.
Figure 4:
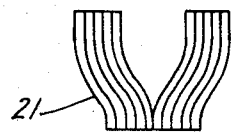
FIG. 4 shows a front view of a further variation of the oscillatable armature.
Figure 6:
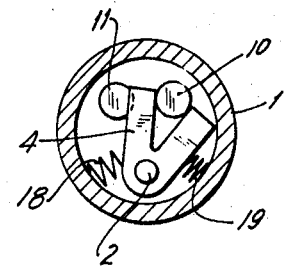
FIG. 6 shows an enlarged transverse cross-sectional view of a modified brush.

In accordance with a further embodiment of the invention, the armature 4 can cooperate with helical springs 18, 19 which react against the internal surface of the housing and bear against the adjoining edge faces of the armature to bias the latter in the plane of oscillatory movement. It is also within the purview of the invention to employ an angle-shaped armature 20, see FIG. 3, and/or to employ an armature which is a laminated structure consisting of several sheets. As shown in FIG. 4, the armature, numbered 21, may be assembled of two substantially S-shaped sections.

It is further clear that the iron core of the electro-magnet can constitute a laminated structure. The base plate can consist of sintered material and it is also possible to make the base plate in one piece with the electromagnet of sintered metal or the like. The permanent magnet can be mounted on a base and it suffices to magnetize only that end of the electromagnet which is remote from such base. It is further within the purview of the invention to employ the improved drive in other types of electrically operated apparatus, for example, in a dry shaver or in another device which is preferably provided with a slender handle.

The basic feature of the invention resides in the novel magnetic interconnection between the permanent magnet and the electromagnets or field windings by way of the oscillatable armature. The magnetic circuit comprises two cycles whose combined conductance remains unchanged. If the drive employs a single electromagnet, the circuit includes a single cycle whose conductivity value varies in response to oscillation of the armature.

Without further analysis, the foregoing will so fully reveal the gist of the present invention that others can by applying current knowledge readily adapt it for various applications without emitting features that, from the standpoint of prior art, fairly constitute essential characteristics of the generic or specific aspects of this invention.

What is claimed as new and desired to be secured by Letters Patent is set forth in the appended claims.

What is claimed is:

1. An electrically actuated appliance comprising, in comprising, in combination, an elongated hollow handle; at least one elongated electromagnet; an elongated permanent magnet, said magnets being arranged in said hollow handle adjacent to each other and extending substantially parallel to each other in the longitudinal direction of said handle and having each one end face located in a common plane located substantially normal to said direction; ferromagnetic means connecting the other ends of the said magnets; an armature mounted in said hollow handle for oscillating movement about an axis substantially parallel to said direction in a plane closely adjacent and parallel to said common plane; a member connected to said armature for oscillation therewith about said axis and extending beyond one end of said elongated housing; and electric circuit means for initiating an alternating magnetic field in said electromagnet so as to oscillate said armature and said member connected thereto.

2. An appliance according to claim 1, wherein two electromagnets are arranged within said hollow handle substantially parallel to each other and said ferromagnetic means consists of a ferromagnetic plate to which said other ends of said two electromagnets and of said permanent magnet are firmly secured.

3. An appliance according to claim 2, wherein said other ends of said magnets are arranged substantially at the corners of a triangle.

4. An appliance according to claim 2, and including a magnetic resistance in said ferromagnetic means between said two electromagnets.

5. An appliance according to claim 2, wherein said electromagnet consists of an iron core firmly secured to said ferromagnetic plate.

6. An appliance according to claim 5, wherein said iron core or cores are sintered to said ferromagnetic plate.

7. An appliance according to claim 1, wherein each of said electromagnets includes an electromagnetic core consisting of laminated dynamo iron plates.

8. An appliance according to claim 1, wherein said electromagnet has an iron core having a circular cross section.

9. An appliance according to claim 1, including at least one spring cooperating with said oscillatable armature.

10. An appliance according to claim 1, wherein said electromagnet has an iron core adhesively connected to said ferromagnetic means.

11. An appliance according to claim 1, wherein said oscillatable armature consists of laminated dynamo plates.

12. An appliance according to claim 1, wherein said oscillatable armature consists of sintered iron.

13. An appliance according to claim 1, wherein said oscillatable armature consists of a substantially V-shaped plate.

14. An appliance according to claim 1, wherein said oscillatable armature is composed of two elongated parts firmly connected to each other at an angle so as to form a V-shaped armature.

References Cited

UNITED STATES PATENTS

| 384,321 | 6/1888 | Mallett | 335—230 |
|---|---|---|---|
| 1,813,630 | 7/1931 | McCarty | 310—29 |
| 2,759,114 | 8/1956 | Rolli et al. | 310—29 |
| 3,124,730 | 3/1964 | Thoma | 310—36 X |

DONOVAN F. DUGGAN, Primary Examiner.

U.S. Cl. X.R.
15—22; 310—36